March 17, 1936. J. HICKMAN 2,034,577
SCISSOR ACTION VEHICLE SPRING
Filed Nov. 22, 1935
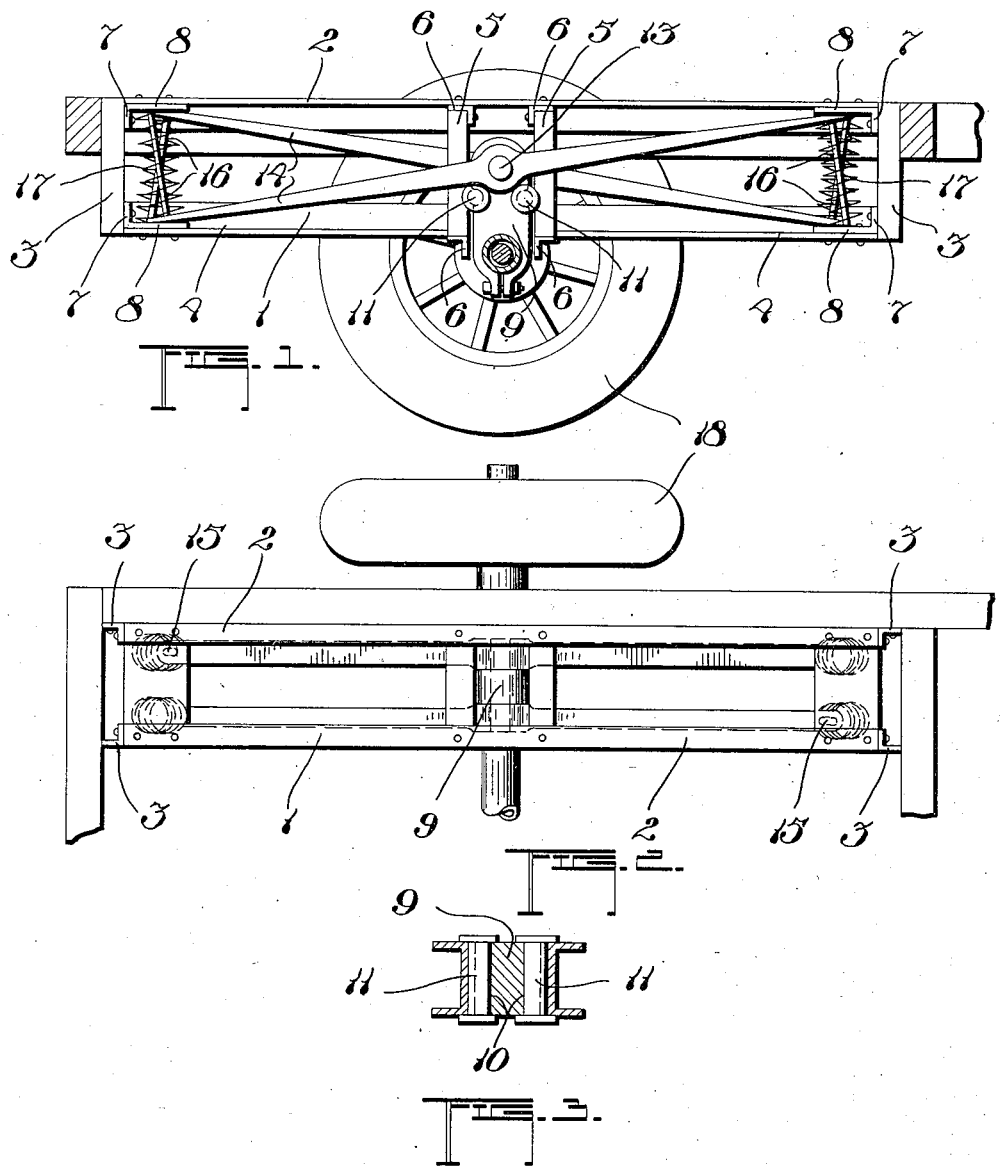
INVENTOR
JOHN HICKMAN
BY *Fetherstonhaugh & Co.*
ATT'YS.

Patented Mar. 17, 1936

2,034,577

UNITED STATES PATENT OFFICE 2,034,577

SCISSOR ACTION VEHICLE SPRING

John Hickman, Tangleflag, Saskatchewan, Canada

Application November 22, 1935, Serial No. 51,122

2 Claims. (Cl. 267—20)

My invention relates to improvements in scissor-action vehicle springs and an object of the invention is to provide a device of the character herein described which is smoother in operation than the usual type of spring in use at the present time.

A further object of my invention is to provide a device of the character herein described which will not easily become out of order.

A still further object of my invention is to provide a device of the character herein described, which is simple to construct and economical to manufacture.

With the above more important objects in view and such other minor objects as may appear as the specification proceeds, my invention consists essentially in the arrangement and construction of parts all as hereinafter more particularly described, reference being had to the accompanying drawing, in which:—

Fig. 1 represents an elevation of my improved type of vehicle spring.

Fig. 2 illustrates a plan view of the same.

Fig. 3 is a sectional view of my rider and rollers taken on the line 3—3 of Figure 1.

In the drawing like characters of reference indicate corresponding parts in the different figures.

My invention consists of a framework 1 composed of two parallel horizontal lying angle bars 2 attached to either end of which I have provided downwardly disposed angle bars 3. Further bars 4 of a similar nature are secured to the lower extremities of the vertical bars 3 and extend toward the centre of my framework where they are fastened to twin opposed channel irons 5 designed to perform as guides for the movable portion of my device in a manner presently to be described.

These irons 5 I have attached to the framework as will be noted by four angle braces 6, the upper pair thereof being fastened to the bars 2 and the lower pair to the bar 4. At either end of the framework within the junction of the horizontal and vertical bars 2 and 3 respectively, I have furnished quadruplicate cross angles 7, the horizontal lying portions 8 of which are extended as shown in the illustrations accompanying this application.

Interposed between the above mentioned channel irons 5, I mount a rider 9 having a configuration as best illustrated in Figures 1 and 2. Opposed circular recesses 10 are provided on either side of the rider to receive twin end flanged rollers 11, the flanges thereof overlapping the channel irons 5 to prevent lateral movement of the rider therebetween. A split collar 12 is made integral with the lower portion of the rider to receive the axle or axle housing of the vehicle with which my device is to be used.

The upper portion of the rider is furnished with outwardly extending trunnions 13 to receive thereupon a pair of tapered balance arms 14. Elongated orifices 15 within the balance arms are designed to receive pins 16 attached at either end to the horizontal sections of the cross angle 7 and provided to maintain the balance arms in situ. Upon each of the four pins 16, I furnish a helical spring 17, one end thereof being attached to a flange 8 and the other end to an extremity of one of the balance arms 14.

A description of my invention having been given, the mode of operation thereof will now be presented.

If a vehicle equipped with my improved type of spring were to pass over a small mound in the roadway, the wheel 18 would be raised, thereby lifting the axle upon which it rotates and consequently the rider 9 mounted thereon. Upward movement of this rider would cause the lower ends of both balance arms to rise and compress the springs attached thereto, whereas upon the rider moving downwardly, the springs attached to the upper ends of the balance arms would be compressed in a similar manner. In this way, I am able to balance the rider and thus the vehicle upon the springs 17 and obtain an efficient yet economical type of vehicle spring.

Since various modifications can be made in the above invention, and many apparently widely different embodiments of same, made within the scope of the claims without departing from the spirit and scope thereof, it is intended that all matter contained in the accompanying specification shall be interpreted as illustrative only and not in a limiting sense and I desire only such limitations placed thereon as are specifically expressed in the accompanying claims.

What I claim as my invention is:—

1. Improvements in vehicle springs comprising a framework, an open ended track provided centrally therewithin, a movable element mounted within said track attachable to a vehicle axle, crossed levers pivoted upon said movable element provided with an orifice adjacent each of the ends thereof, pins attached to said framework and passing through said orifices, helical springs fastened to the ends of said levers and said framework, said springs encircling said pins, said levers and said movable element coacting to apply the pressure of said vehicle upon said springs.

2. The device as claimed in claim 1 in which said movable element is mounted upon rollers inserted between said movable element and said framework.

JOHN HICKMAN.